United States Patent
Akita

(10) Patent No.: US 11,493,064 B2
(45) Date of Patent: Nov. 8, 2022

(54) FLUID PRESSURE CYLINDER

(71) Applicant: SMC CORPORATION, Tokyo (JP)

(72) Inventor: Takafumi Akita, Moriya (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/305,820

(22) Filed: Jul. 15, 2021

(65) Prior Publication Data

US 2022/0025913 A1   Jan. 27, 2022

(30) Foreign Application Priority Data

Jul. 22, 2020  (JP) .............................. JP2020-125283

(51) Int. Cl.
   *F15B 15/22*   (2006.01)
   *F15B 15/14*   (2006.01)

(52) U.S. Cl.
   CPC .......... *F15B 15/227* (2013.01); *F15B 15/149* (2013.01); *F15B 15/223* (2013.01); *F15B 15/1433* (2013.01); *F15B 15/222* (2013.01)

(58) Field of Classification Search
   CPC ...... F15B 15/227; F15B 15/222; F15B 15/22; F15B 15/223; F15B 15/149
   See application file for complete search history.

(56) References Cited

U.S. PATENT DOCUMENTS

| | | | | |
|---|---|---|---|---|
| 2,804,052 A | * | 8/1957 | Halladay ............... | F15B 15/222 91/26 |
| 2,935,047 A | * | 5/1960 | Roberta ................ | F15B 15/223 91/396 |
| 3,267,815 A | * | 8/1966 | Ortman ................. | F15B 15/222 91/26 |
| 4,301,714 A | * | 11/1981 | Stenlund ............... | F15B 15/222 91/394 |

(Continued)

FOREIGN PATENT DOCUMENTS

| | | |
|---|---|---|
| EP | 2 047 116 B1 | 7/2010 |
| GB | 2 095 753 A | 10/1982 |

(Continued)

OTHER PUBLICATIONS

Extended European Search Report dated Dec. 1, 2021 in European Patent Application No. 21186595.1, 8 pages.

*Primary Examiner* — Dustin T Nguyen
(74) *Attorney, Agent, or Firm* — Oblon, McClelland, Maier & Neustadt, L.L.P.

(57)   ABSTRACT

Cushion holes are provided in cover members, tubular cushion rings are provided on a piston and a piston rod so as to be insertable into and withdrawable from the cushion holes as the piston moves, cushion packings capable of slidably contacting the outer circumference of the cushion rings are mounted to be movable in an axial direction, in mounting grooves formed on inner walls of the cover members constituting the cushion holes, the cushion pack- (Continued)

ings each include a plurality of protrusions extending from the outer circumferential surface to the side surface near the piston and disposed circumferentially alongside one another, and cushioning grooves that extend in parallel with the axis of the cushion rings and whose cross-sectional area changes are formed on the outer circumferential surface of the cushion rings.

7 Claims, 15 Drawing Sheets

(56) References Cited

U.S. PATENT DOCUMENTS

| | | | | |
|---|---|---|---|---|
| 4,424,737 | A | * | 1/1984 | Endo .......................... F16F 9/49 |
| | | | | 91/396 |
| 4,458,717 | A | * | 7/1984 | Boland ................. F15B 15/223 |
| | | | | 137/496 |
| 5,943,939 | A | * | 8/1999 | Orihara ................. F15B 15/223 |
| | | | | 91/407 |
| 7,581,485 | B2 | * | 9/2009 | Riedel .................... F15B 15/082 |
| | | | | 91/395 |
| 7,900,549 | B2 | * | 3/2011 | Kobayashi ............ F15B 15/222 |
| | | | | 91/394 |
| 2002/0020288 | A1 | * | 2/2002 | Dougami .............. F15B 15/222 |
| | | | | 92/85 R |
| 2016/0273559 | A1 | * | 9/2016 | Takai ...................... F15B 15/14 |

FOREIGN PATENT DOCUMENTS

| | | |
|---|---|---|
| JP | 60-118007 U | 8/1985 |
| JP | 63-62608 U | 4/1988 |
| JP | 4-302778 A | 10/1992 |
| JP | 2001-146908 A | 5/2001 |
| JP | 2013-238269 A | 11/2013 |

* cited by examiner

FLUID PRESSURE CYLINDER

CROSS-REFERENCE TO RELATED APPLICATION

This application is based upon and claims the benefit of priority from Japanese Patent Application No. 2020-125283 filed on Jul. 22, 2020, the contents of which are incorporated herein by reference.

BACKGROUND OF THE INVENTION

Field of the Invention

The present invention relates to a fluid pressure cylinder equipped with a mechanism for decelerating a piston.

Description of the Related Art

Conventionally, a fluid pressure cylinder has been known which is provided with a cushioning mechanism for decelerating a piston in the vicinity of a stroke end of the piston.

For example, in JP 2013-238269 A, a fluid pressure cylinder is disclosed in which a first cushion ring, which is capable of being inserted into and withdrawn from a cushion hole formed in a head cover, is mounted on a piston, and a second cushion ring, which is capable of being inserted into and withdrawn from a rod hole formed in a rod cover, is mounted on a piston rod.

In such a fluid pressure cylinder, when the piston is displaced in the vicinity of the head cover, the first cushion ring is inserted into the cushion hole, and a first seal ring attached to an inner circumferential surface of the cushion hole is placed in sliding contact with an outer circumferential surface of the first cushion ring. Consequently, a pressure fluid is discharged at a flow rate corresponding to a flow path area set by an adjustment mechanism provided in the head cover, and the discharge amount of the pressure fluid is reduced.

Further, when the piston is displaced in the vicinity of the rod cover, the second cushion ring is inserted into the rod hole, and a second seal ring attached to an inner circumferential surface of the rod hole is placed in sliding contact with an outer circumferential surface of the second cushion ring. Consequently, the pressure fluid is discharged at a flow rate corresponding to a flow path area set by an adjustment mechanism provided in the rod cover, and the discharge amount of the pressure fluid is reduced.

However, a fluid pressure cylinder has not yet been adequately developed in which the flow path area until the piston decelerates and stops in the vicinity of the stroke end, and the flow path area when the piston starts to move from the state in which the piston stops at the stroke end can be finely set according to the displacement of the piston.

SUMMARY OF THE INVENTION

An object of the present invention is to solve the aforementioned problems.

A fluid pressure cylinder according to the present invention includes a cylinder tube and a cover member fixed to an end of the cylinder tube, and includes a pressure chamber formed between a piston and the cover member. A port configured to supply and discharge a pressure fluid to and from the pressure chamber, and a cushion hole configured to connect the pressure chamber and the port are provided in the cover member. In addition, a tubular cushion ring is attached to the piston or a piston rod so as to be insertable into and withdrawable from the cushion hole as the piston moves, a cushion packing having an annular shape and configured to slidably contact an outer circumference of the cushion ring is mounted in a mounting groove formed on an inner wall of the cover member constituting the cushion hole, the cushion packing being configured to be movable in an axial direction, the cushion packing includes a plurality of protrusions extending from an outer circumferential surface of the cushion packing to a side surface thereof near the piston, and disposed alongside one another in a circumferential direction, and a cushioning groove extending in a direction parallel to an axis of the cushion ring and having a cross-sectional area that changes is formed on an outer circumferential surface of the cushion ring.

In accordance with the fluid pressure cylinder according to the present invention, by combining the cushioning groove that is formed in the cushion ring and whose cross-sectional area changes, and the cushion packing which is capable of moving in the axial direction inside the mounting groove, the flow path area when the piston approaches and stops at the stroke end, and the flow path area when the piston starts to move from the stroke end can be finely set according to the displacement of the piston.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE PREFERRED EMBODIMENTS

First Embodiment

A description will be given with reference to FIGS. 1 to 10 concerning a fluid pressure cylinder 10 according to a first embodiment. The fluid that is used is a pressure fluid such as compressed air or the like.

Figure 1:
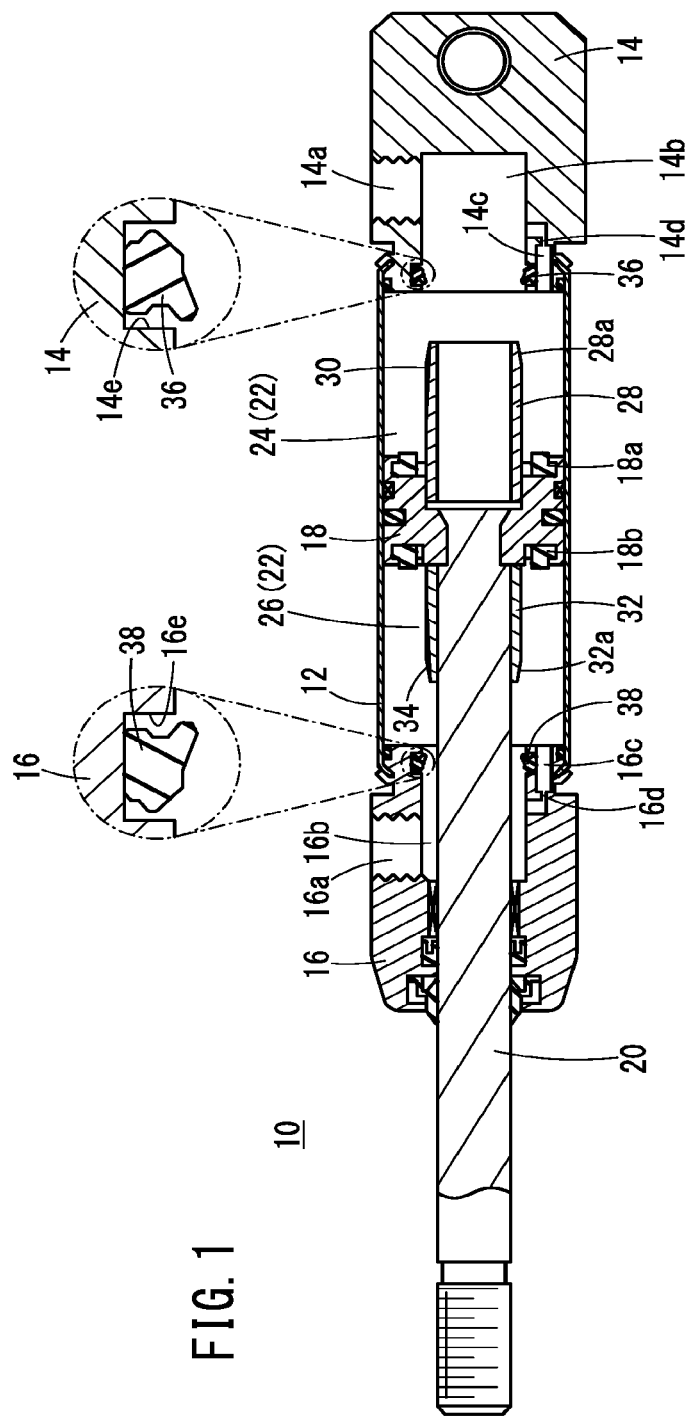
FIG. 1 is a cross-sectional view of a fluid pressure cylinder according to a first embodiment of the present invention.

As shown in FIG. 1, the fluid pressure cylinder 10 is constituted from a cylinder tube 12, a head cover 14, a rod cover 16, a piston 18, a piston rod 20, and the like. The head cover 14 which serves as a cover member is fixed to one end of the cylinder tube 12, and the rod cover 16 which also serves as a cover member is fixed to another end of the cylinder tube 12. A cylinder chamber 22 is formed on an inner side of the cylinder tube 12.

The piston 18 is arranged in the cylinder chamber 22, one end of the piston rod 20 is connected to the piston 18 and another end of the piston rod 20 penetrates through the rod cover 16 and extends to the exterior. The cylinder chamber 22 is divided into a first pressure chamber 24, which is formed between the piston 18 and the head cover 14, and a second pressure chamber 26, which is formed between the piston 18 and the rod cover 16.

The head cover 14 includes a first port 14a through which the pressure fluid is supplied to and discharged from the first pressure chamber 24, and a first cushion hole 14b connecting the first pressure chamber 24 and the first port 14a. The rod cover 16 includes a second port 16a through which the pressure fluid is supplied to and discharged from the second pressure chamber 26, and a second cushion hole 16b connecting the second pressure chamber 26 and the second port 16a.

A cylindrical first cushion ring 28 extending toward the head cover 14 is attached to an end of the piston 18 on the side of the head cover 14. A tapered portion 28a is formed at an end of the first cushion ring 28. An outer diameter of the first cushion ring 28 is smaller than the diameter of the first cushion hole 14b, and the first cushion ring 28 is capable of being inserted into and withdrawn from the first cushion hole 14b.

A mounting groove 14e for mounting a first cushion packing 36 is formed on an inner wall of the head cover 14 constituting the first cushion hole 14b. The annular shaped first cushion packing 36 is capable of slidably contacting the first cushion ring 28, and is mounted so as to be capable of moving in the axial direction inside the mounting groove 14e.

Figure 2:
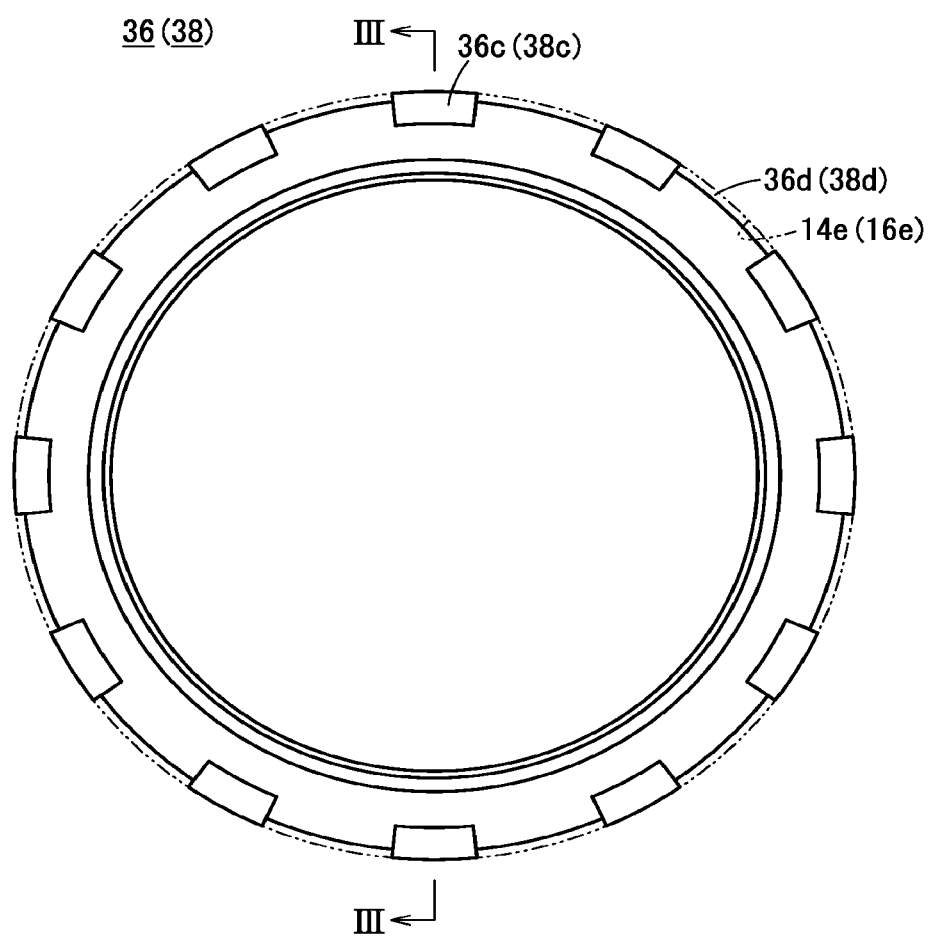
FIG. 2 is a view of a cushion packing of the fluid pressure cylinder shown in FIG. 1 as viewed from an axial direction thereof.
Figure 3:
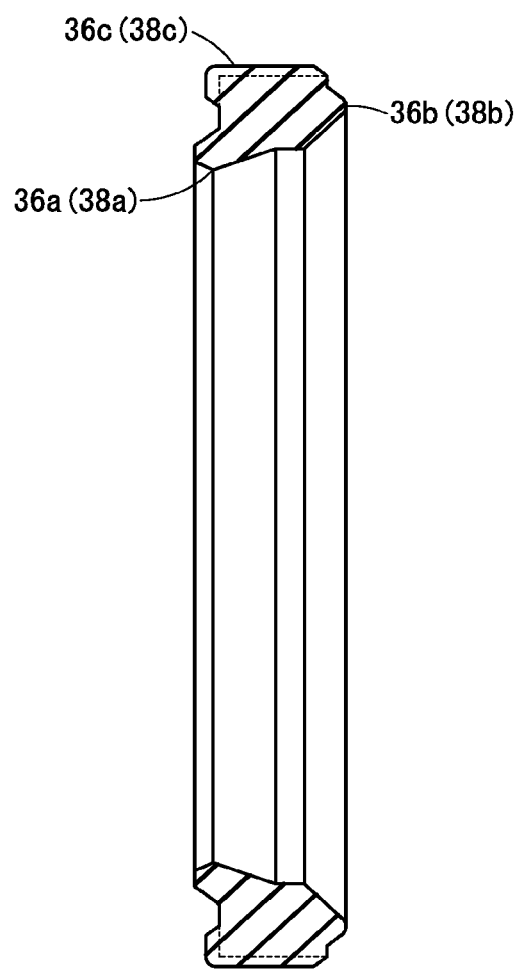
FIG. 3 is a cross-sectional view taken along line III-III of the cushion packing shown in FIG. 2.

As shown in FIG. 3, the first cushion packing 36 includes an annular shaped inner diametrical side projection 36a that projects out toward an inner side in a radial direction from the inner circumferential surface thereof, and an annular shaped axially directed projection 36b that projects out in an axial direction from a side surface separated away from the piston 18. As shown in FIGS. 2 and 3, the first cushion packing 36 includes a plurality of protrusions 36c provided at equal intervals in the circumferential direction and extending from the outer circumferential surface of the first cushion packing 36 to a side surface near the piston 18. Distal ends of the plurality of protrusions 36c positioned on the outer circumference are in contact with the bottom surface of the mounting groove 14e at all times. When the first cushion packing 36 is moved inside the mounting groove 14e in a direction approaching the piston 18, the distal ends of the plurality of protrusions 36c positioned on the side surface come into contact with one side surface (a side surface near the piston 18) of the mounting groove 14e.

The first cushion packing 36 is in sliding contact with an outer circumference of the first cushion ring 28 at the inner diametrical side projection 36a. Gaps 36d are formed between adjacent ones of the protrusions 36c. When the first cushion packing 36 is placed in sliding contact with the first cushion ring 28, the gaps 36d enable communication between the first pressure chamber 24 and the first cushion hole 14b, and serve as passages for the pressure fluid. The gaps 36d are spaces that are surrounded by the first cushion packing 36 and the wall surface of the mounting groove 14e. When the axially directed projection 36b of the first cushion packing 36 comes into contact with another side surface (a side surface separated away from the piston 18) of the mounting groove 14e, communication between the first pressure chamber 24 and the first cushion hole 14b via the gaps 36d is blocked.

A cylindrical second cushion ring 32 is attached to an outer circumference of one end of the piston rod 20. A tapered portion 32a is formed at an end of the second cushion ring 32. An outer diameter of the second cushion ring 32 is smaller than the diameter of the second cushion hole 16b, and the second cushion ring 32 is capable of being inserted into and withdrawn from the second cushion hole 16b.

A mounting groove 16e for mounting a second cushion packing 38 is formed on an inner wall of the rod cover 16 constituting the second cushion hole 16b. The annular shaped second cushion packing 38 is capable of slidably contacting the second cushion ring 32, and is mounted so as to be capable of moving in the axial direction inside the mounting groove 16e.

As shown in FIG. 3, the second cushion packing 38 includes an annular shaped inner diametrical side projection 38a that projects out toward an inner side in a radial direction from the inner circumferential surface thereof, and an annular shaped axially directed projection 38b that projects out in an axial direction from a side surface separated away from the piston 18. As shown in FIGS. 2 and 3, the second cushion packing 38 includes a plurality of protrusions 38c provided at equal intervals in the circumferential direction and extending from the outer circumferential surface of the second cushion packing 38 to a side surface near the piston 18. Distal ends of the plurality of protrusions 38c positioned on the outer circumference are in contact with the bottom surface of the mounting groove 16e at all times. When the second cushion packing 38 is moved inside the mounting groove 16e in a direction approaching the piston 18, the distal ends of the plurality of protrusions 38c positioned on the side surface come into contact with one side surface (a side surface near the piston 18) of the mounting groove 16e. Moreover, since the second cushion packing 38 has the same structure as that of the first cushion packing 36, descriptions concerning these respective cushion packings will be made while referring to the same drawings (FIGS. 2 and 3).

The second cushion packing 38 is in sliding contact with an outer circumference of the second cushion ring 32 at the inner diametrical side projection 38a. Gaps 38d are formed between adjacent ones of the protrusions 38c. When the second cushion packing 38 is placed in sliding contact with the second cushion ring 32, the gaps 38d enable communication between the second pressure chamber 26 and the second cushion hole 16b, and serve as passages for the pressure fluid. The gaps 38d are spaces that are surrounded by the second cushion packing 38 and the wall surface of the mounting groove 16e. When the axially directed projection 38b of the second cushion packing 38 comes into contact with another side surface (a side surface separated away from the piston 18) of the mounting groove 16e, communication between the second pressure chamber 26 and the second cushion hole 16b via the gaps 38d is blocked.

Figure 4:
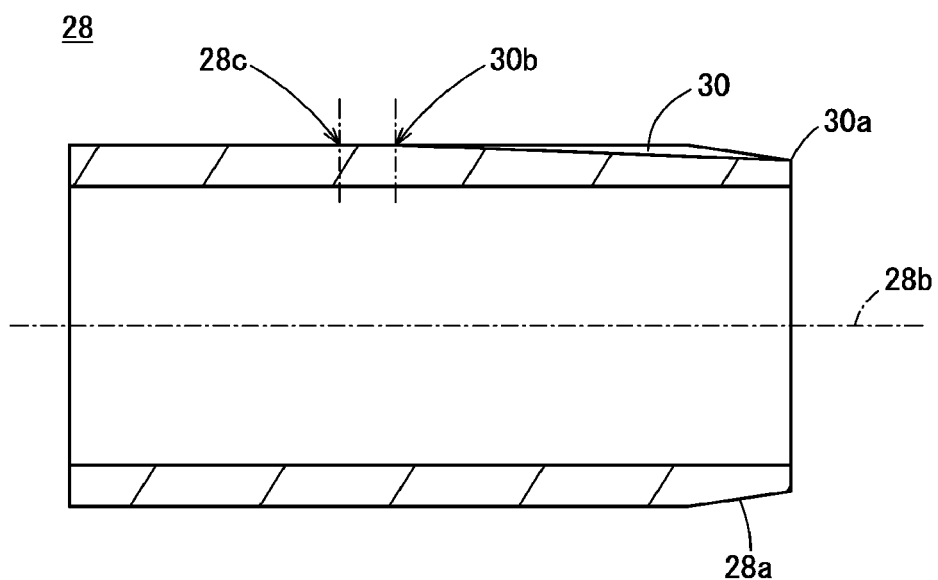
FIG. 4 is a cross-sectional view of a cushion ring of the fluid pressure cylinder shown in FIG. 1.

As shown in FIG. 4, a plurality of head side cushioning grooves 30 extending in a direction parallel to an axis 28b of the first cushion ring 28 are formed on the outer circumference of the first cushion ring 28. The head side cushioning grooves 30 start at an end (a starting end 30a) of the first cushion ring 28 on the side of the head cover 14, and end at a position (a terminal end 30b) that is more separated away from the piston 18 than a location 28c in contact with the first cushion packing 36 at a stroke end where the piston 18 comes into contact with the head cover 14. Stated otherwise, at the stroke end of the piston 18 on the head side, the first cushion packing 36 is in intimate contact with the outer circumferential surface of the first cushion ring 28 on which the head side cushioning grooves 30 are not formed (see FIG. 7). Moreover, an annular shaped first elastic body 18a is mounted on the piston 18 in a manner so as to partially project out from the end surface thereof on the side of the head cover 14, and the piston 18 comes into contact with the head cover 14 via the first elastic body 18a.

Bottom surfaces of the head side cushioning grooves 30 are inclined from the starting end 30a to the terminal end 30b of the head side cushioning grooves 30 with respect to the axis 28b of the first cushion ring 28 in a manner so as to gradually separate away from the axis 28b. When the first cushion packing 36 straddles across the head side cushioning grooves 30 and comes into contact with the outer circumferential surface of the first cushion ring 28, the head side cushioning grooves 30 are not blocked by the first cushion packing 36, and the first pressure chamber 24 communicates with the first port 14a over a predetermined flow path area.

Figure 5:
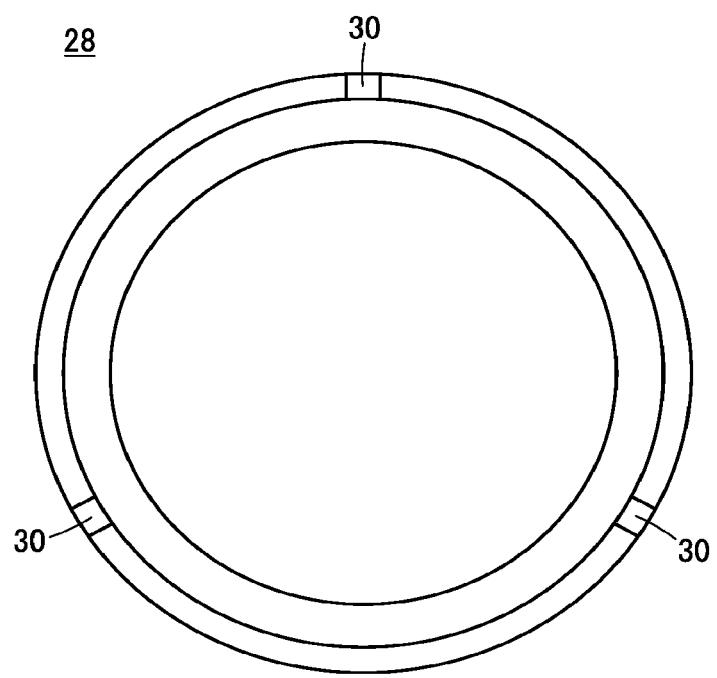
FIG. 5 is a view of the cushion ring shown in FIG. 4 as viewed from an axial direction thereof.
Figure 6:
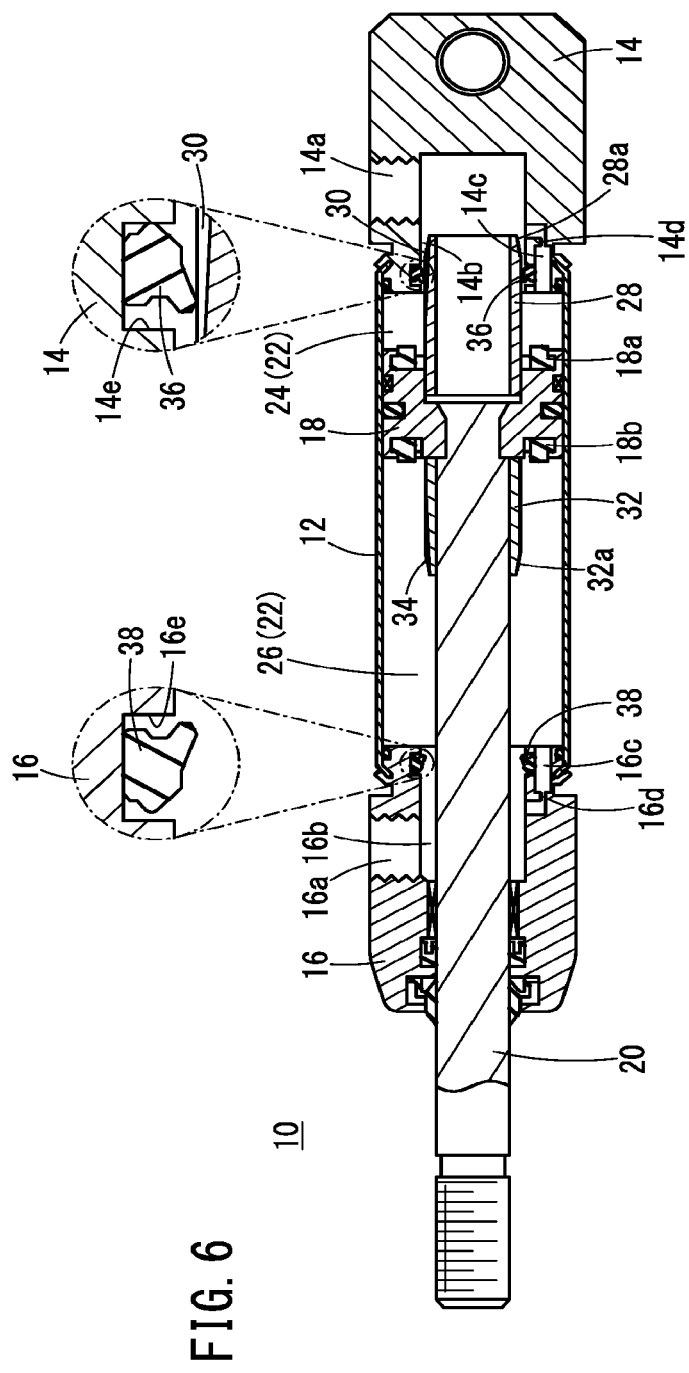
FIG. 6 is a cross-sectional view when the fluid pressure cylinder shown in FIG. 1 is in the vicinity of a stroke end on a head side.

According to the present embodiment, three head side cushioning grooves 30 having the same configuration are disposed around the axis 28b of the first cushion ring 28 at intervals of 120 degrees (see FIG. 5). Further, according to the present embodiment, the tapered portion 28a is formed on the first cushion ring 28, and the first cushion packing 36 does not contact the tapered portion 28a. Therefore, the head side cushioning grooves 30, which are formed at sites of the first cushion ring 28 other than the tapered portion 28a, contribute to a cushioning effect as will be described later. The head side cushioning grooves 30 at sites with which the first cushion packing 36 is capable of coming into contact gradually become shallower toward the terminal end 30b, and the cross-sectional area thereof gradually decreases accordingly.

Similarly to the first cushion ring 28, a plurality of rod side cushioning grooves 34, which extend in a direction parallel to an axis of the second cushion ring 32, are formed on the outer circumference of the second cushion ring 32. The rod side cushioning grooves 34 start at an end of the second cushion ring 32 on the side of the rod cover 16, and end at a position that is more separated away from the piston 18 than a location in contact with the second cushion packing 38 at a stroke end where the piston 18 comes into contact with the rod cover 16. Stated otherwise, at the stroke end of the piston 18 on the rod side, the second cushion packing 38 is in intimate contact with the outer circumferential surface of the second cushion ring 32 on which the rod side cushioning grooves 34 are not formed (see FIG. 9). Moreover, an annular shaped second elastic body 18b is mounted on the piston 18 in a manner so as to partially project out from the end surface thereof on the side of the rod cover 16, and the piston 18 comes into contact with the rod cover 16 via the second elastic body 18b.

Bottom surfaces of the rod side cushioning grooves 34 are inclined from the starting end to the terminal end of the rod side cushioning grooves 34 with respect to the axis of the second cushion ring 32 in a manner so as to gradually separate away from the axis. When the second cushion packing 38 straddles across the rod side cushioning grooves 34 and comes into contact with the outer circumferential surface of the second cushion ring 32, the rod side cushioning grooves 34 are not blocked by the second cushion packing 38, and the second pressure chamber 26 communicates with the second port 16a over a predetermined flow path area.

According to the present embodiment, three rod side cushioning grooves 34 having the same configuration are disposed around the axis of the second cushion ring 32 at intervals of 120 degrees. Further, according to the present embodiment, the tapered portion 32a is formed on the second cushion ring 32, and the second cushion packing 38 does not contact the tapered portion 32a. Therefore, the rod side cushioning grooves 34, which are formed at sites of the second cushion ring 32 other than the tapered portion 32a, contribute to a cushioning effect as will be described later. The rod side cushioning grooves 34 at sites with which the second cushion packing 38 is capable of coming into contact gradually become shallower toward the terminal end, and the cross-sectional area thereof gradually decreases accordingly.

A first bypass passage 14c connecting the first pressure chamber 24 and the first cushion hole 14b is provided in the head cover 14. One end of the first bypass passage 14c opens on an end surface of the head cover 14 facing toward the first pressure chamber 24. Another end of the first bypass passage 14c is connected to the first cushion hole 14b at a position more separated away from the piston 18 than a location where the first cushion packing 36 is mounted.

A cross-sectional area at a location midway of the first bypass passage 14c is reduced to thereby form a first fixed orifice 14d. When the first cushion ring 28 is inserted into the first cushion hole 14b, a gap exists over the entire circumference, between the outer circumference of the first cushion ring 28 and an inner wall surface of the head cover 14 constituting the first cushion hole 14b. Accordingly, irrespective of the position of the piston 18, the first pressure chamber 24 communicates with the first port 14a via the first bypass passage 14c with the first fixed orifice 14d interposed therein.

A second bypass passage 16c connecting the second pressure chamber 26 and the second cushion hole 16b is provided in the rod cover 16. One end of the second bypass passage 16c opens on an end surface of the rod cover 16 facing toward the second pressure chamber 26. Another end of the second bypass passage 16c is connected to the second cushion hole 16b at a position more separated away from the piston 18 than a location where the second cushion packing 38 is mounted.

A cross-sectional area at a location midway of the second bypass passage 16c is reduced to thereby form a second fixed orifice 16d. When the second cushion ring 32 is inserted into the second cushion hole 16b, a gap exists over the entire circumference, between the outer circumference of the second cushion ring 32 and an inner wall surface of the rod cover 16 constituting the second cushion hole 16b. Accordingly, irrespective of the position of the piston 18, the second pressure chamber 26 communicates with the second port 16a via the second bypass passage 16c with the second fixed orifice 16d interposed therein.

The fluid pressure cylinder 10 according to the present embodiment is configured in the manner described above, and operations thereof will be described hereinbelow. As shown in FIG. 1, an initial state is illustrated, which is a state in which the piston 18 is located at a position approximately equidistant from the head cover 14 and the rod cover 16, and the pressure fluid is not supplied to or accumulated in the first pressure chamber 24 and the second pressure chamber 26.

When the position of a non-illustrated switching valve is switched from the aforementioned initial state, and the pressure fluid is supplied to the first pressure chamber 24 together with the pressure fluid being discharged from the second pressure chamber 26, the piston 18 is driven toward the rod cover 16. Then, when the piston 18 is moved a predetermined distance, the second cushion ring 32 is inserted integrally with the piston rod 20 into the second cushion hole 16b of the rod cover 16, together with the second cushion packing 38 that is mounted on the rod cover 16 being placed in sliding contact with the outer circumferential surface of the second cushion ring 32 on the inner diametrical side projection 38a thereof (see FIG. 8).

When placed in sliding contact with the second cushion ring 32, the second cushion packing 38 moves inside the mounting groove 16e of the rod cover 16 in a direction away from the piston 18, due to contact friction with the second cushion ring 32. In addition, the axially directed projection 38b of the second cushion packing 38 comes into contact with the other side surface of the mounting groove 16e, and communication between the second pressure chamber 26 and the second cushion hole 16b via the gaps 38d between adjacent ones of the protrusions 38c is blocked.

From the time at which the second cushion packing 38 begins to be placed in sliding contact with the second cushion ring 32 until the second cushion packing 38 reaches the terminal end of the rod side cushioning grooves 34 prior to the piston 18 reaching the stroke end, the flow path area through which the second pressure chamber 26 and the second port 16a communicate takes a value obtained by adding the cross-sectional area of the second fixed orifice 16d to the cross-sectional area of the rod side cushioning grooves 34 at the location where the second cushion packing 38 is placed in contact. From the time at which the second cushion packing 38 reaches the terminal end of the rod side cushioning grooves 34 until the piston 18 reaches the stroke end, the flow path area becomes equal to the cross-sectional area of the second fixed orifice 16d. More specifically, when the piston 18 approaches and stops at the stroke end on the rod side, a so-called meter-out control is performed in which the flow path area through which the pressure fluid is discharged from the second pressure chamber 26 gradually decreases, and thereafter becomes constant, whereby a desired cushioning effect is obtained.

Figure 9:
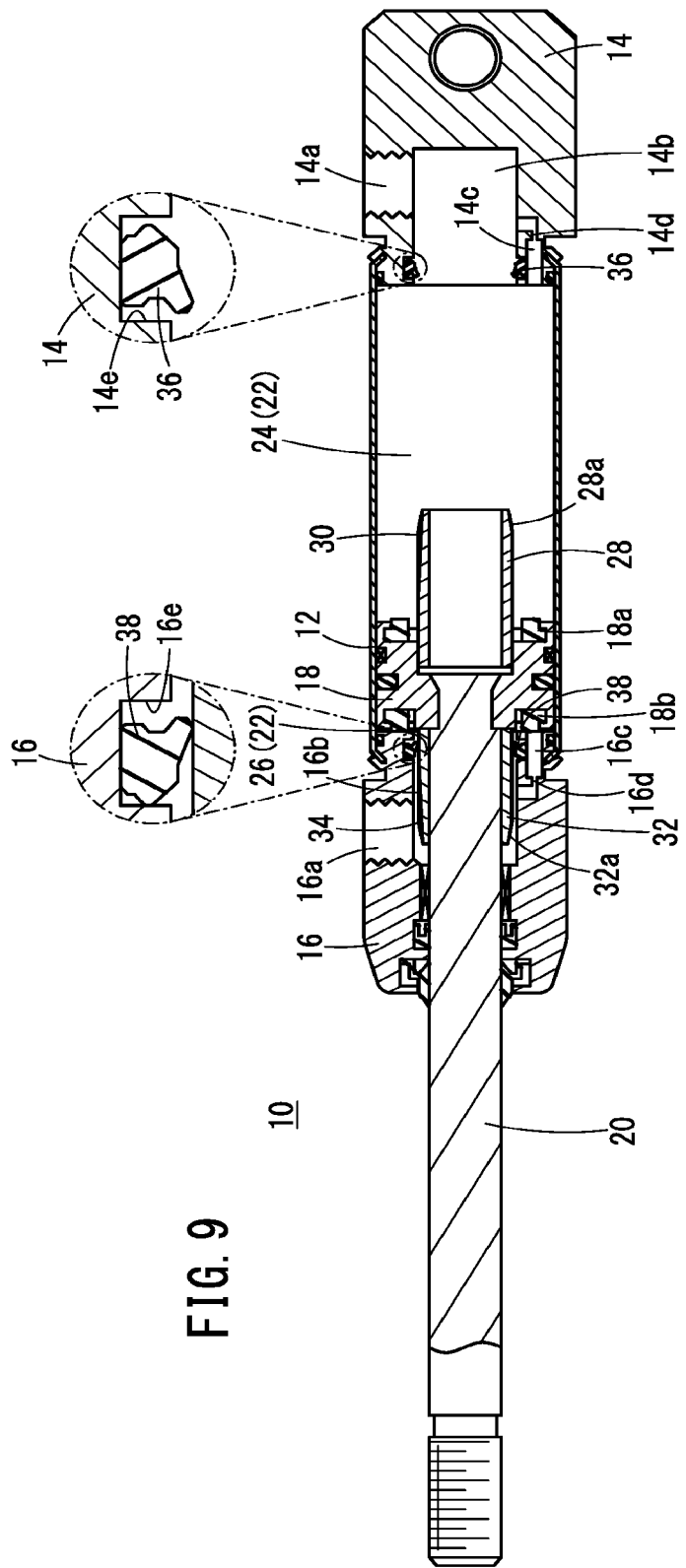
FIG. 9 is a cross-sectional view when the fluid pressure cylinder shown in FIG. 1 has reached the stroke end on the rod side.

In a state in which the piston 18 reaches the stroke end on the rod side, and the piston rod 20 is maximally pushed out, work such as positioning of a non-illustrated workpiece or the like is carried out (see FIG. 9). Thereafter, when the position of the non-illustrated switching valve is switched, and the pressure fluid is supplied to the second pressure chamber 26 together with the pressure fluid being discharged from the first pressure chamber 24, the piston 18 is driven toward the head cover 14.

When the piston 18 is driven toward the head cover 14, the second cushion packing 38 moves inside the mounting groove 16e of the rod cover 16 in a direction approaching the piston 18, due to contact friction with the second cushion ring 32 and the pressure of the fluid supplied from the second port 16a. Then, the axially directed projection 38b of the second cushion packing 38 is separated away from the other side surface of the mounting groove 16e, and the second pressure chamber 26 is placed in communication with the second cushion hole 16b via the gaps 38d between adjacent ones of the protrusions 38c of the second cushion packing 38.

From the time at which the piston 18 starts to move toward the head cover 14 until the second cushion ring 32 is withdrawn from the second cushion hole 16b and the second cushion packing 38 is separated away from the outer circumference of the second cushion ring 32, the flow path area through which the pressure fluid is supplied to the second pressure chamber 26 is maintained at a constant value obtained by adding together the cross-sectional area of the second fixed orifice 16d and the area of the gaps 38d between adjacent ones of the protrusions 38c, and thereafter takes a value obtained by adding, to this constant value, the cross-sectional area of the rod side cushioning grooves 34 which gradually increases. More specifically, when the piston 18 starts to move from the stroke end on the rod side, a so-called meter-in control is performed in which the flow path area through which the pressure fluid is supplied to the second pressure chamber 26 is maintained at a constant value, and thereafter, gradually increases. Since the flow path area at the time of the meter-in control is greater, by the area of the gaps 38d, than the flow path area at the time of the aforementioned meter-out control, it is possible to suppress a runaway phenomenon of the piston 18, and thereby obtain a smooth movement start-up characteristic.

Figure 10:
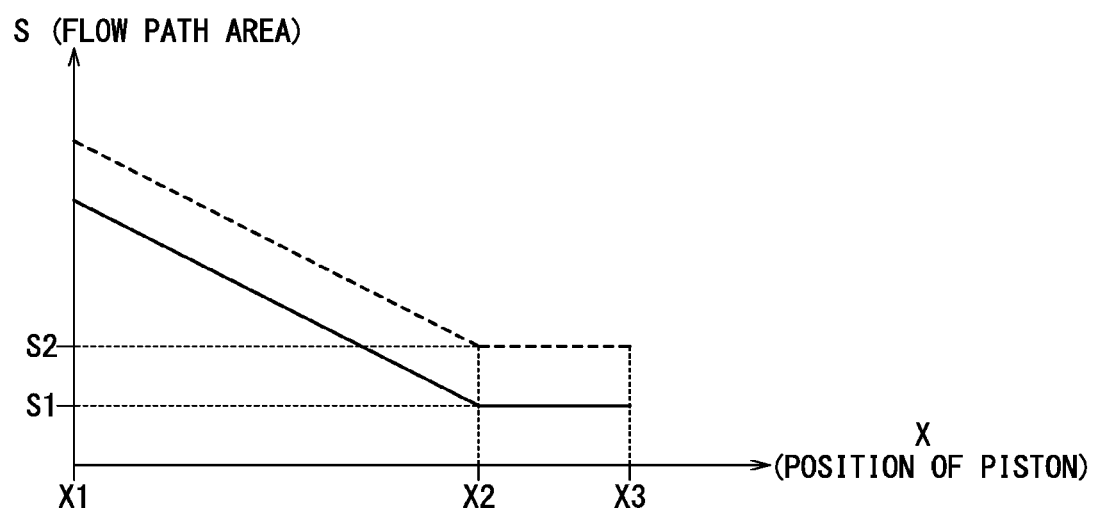
FIG. 10 is a graph showing a relationship between a position of a piston and a flow path area in the vicinity of a stroke end, for the fluid pressure cylinder shown in FIG. 1.

In FIG. 10, there are shown a relationship between the position X of the piston 18 when the piston 18 approaches and stops at the stroke end on the rod side, and the flow path area S through which the pressure fluid is discharged from the second pressure chamber 26, as well as a relationship between the position X of the piston 18 when the piston 18 starts to move from the stroke end on the rod side, and the flow path area S through which the pressure fluid is supplied to the second pressure chamber 26. The former relationship is shown by the solid line, and the latter relationship is shown by the dotted line.

In FIG. 10, X1 indicates a position of the piston 18 when the second cushion packing 38 starts to be placed in sliding contact with the second cushion ring 32 or when such sliding contact is completed. X2 indicates a position of the piston 18 when the second cushion packing 38 is positioned at the terminal end of the rod side cushioning grooves 34. X3 indicates a position of the piston 18 at the stroke end on the rod side. Further, S1 is the cross-sectional area of the second fixed orifice 16d, and S2 is an area obtained by adding the area of the gaps 38d between the protrusions 38c of the second cushion packing 38 to the cross-sectional area of the second fixed orifice 16d. As will be described later, the relationship between the position X of the piston 18 and the flow path area S in the vicinity of the stroke end on the head side of the piston 18 is the same as the foregoing. Moreover, since the second cushion packing 38 is capable of moving in the axial direction inside the mounting groove 16e, strictly speaking, the value of X2 when the piston 18 approaches the stroke end and the value of X2 when the piston 18 starts to move from the stroke end, for example, do not always coincide with each other. However, in FIG. 10, the values are shown as coinciding for the sake of convenience.

When the second cushion ring 32 is withdrawn from the second cushion hole 16b and the second cushion packing 38 is separated away from the outer circumference of the second cushion ring 32, the flow path area through which the pressure fluid is supplied to the second pressure chamber 26 becomes maximum, and the speed of the piston rapidly increases. Then, when the piston 18 approaches the head cover 14, the first cushion ring 28 is inserted integrally with the piston 18 into the first cushion hole 14b of the head cover 14, together with the first cushion packing 36 that is mounted on the head cover 14 being placed in sliding contact with the outer circumferential surface of the first cushion ring 28 (see FIG. 6).

When placed in sliding contact with the first cushion ring 28, the first cushion packing 36 moves inside the mounting groove 14e of the head cover 14 in a direction away from the piston 18, due to contact friction with the first cushion ring 28. Then, the axially directed projection 36b of the first cushion packing 36 comes into contact with the other side surface of the mounting groove 14e, and communication between the first pressure chamber 24 and the first cushion hole 14b via the gaps 36d between adjacent ones of the protrusions 36c is blocked.

From the time at which the first cushion packing 36 begins to be placed in sliding contact with the first cushion ring 28 until the first cushion packing 36 reaches the terminal end 30b of the head side cushioning grooves 30 prior to the piston 18 reaching the stroke end, the flow path area through which the first pressure chamber 24 and the first port 14a communicate takes a value obtained by adding the cross-sectional area of the first fixed orifice 14d to the cross-sectional area of the head side cushioning grooves 30 at the location where the first cushion packing 36 is placed in contact. From the time at which the first cushion packing 36 reaches the terminal end 30b of the head side cushioning grooves 30 until the piston 18 reaches the stroke end, the flow path area becomes equal to the cross-sectional area of the first fixed orifice 14d. More specifically, when the piston 18 approaches and stops at the stroke end on the head side, a so-called meter-out control is performed in which the flow path area through which the pressure fluid is discharged from the first pressure chamber 24 gradually decreases, and thereafter becomes constant, whereby a desired cushioning effect is obtained.

Figure 7:
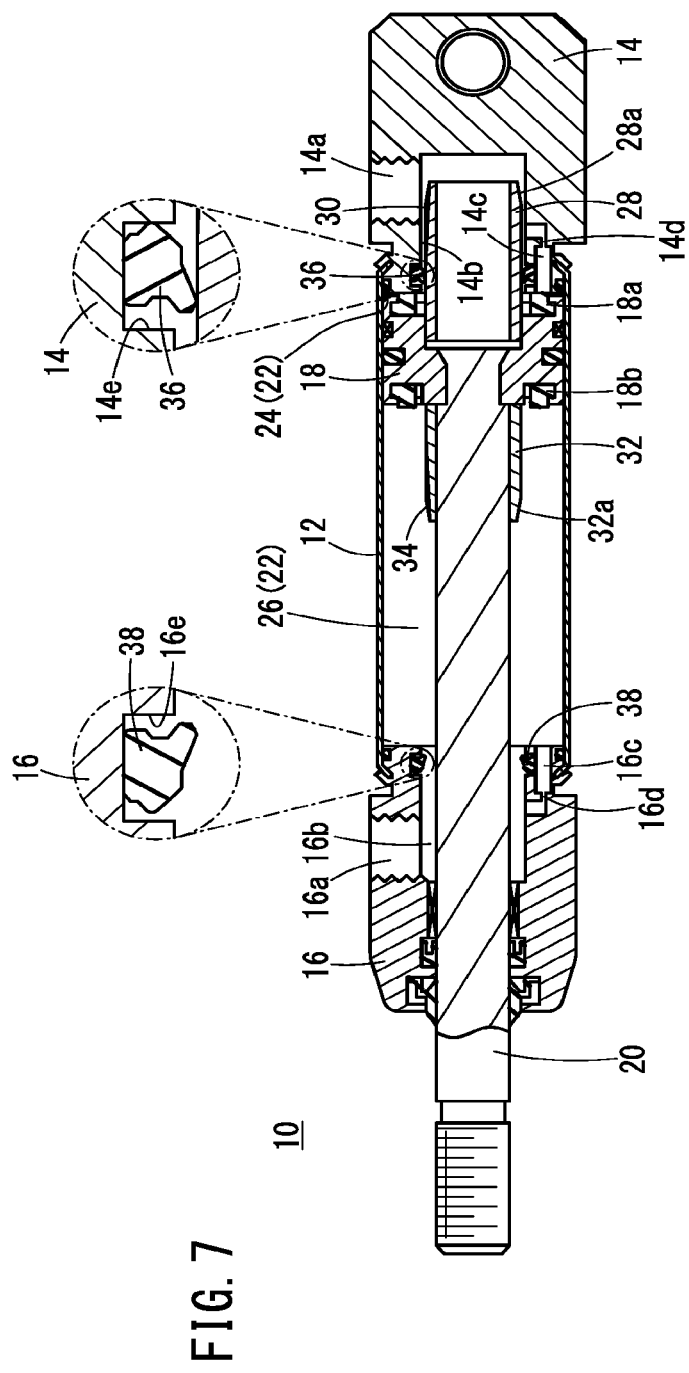
FIG. 7 is a cross-sectional view when the fluid pressure cylinder shown in FIG. 1 has reached the stroke end on the head side.
Figure 8:
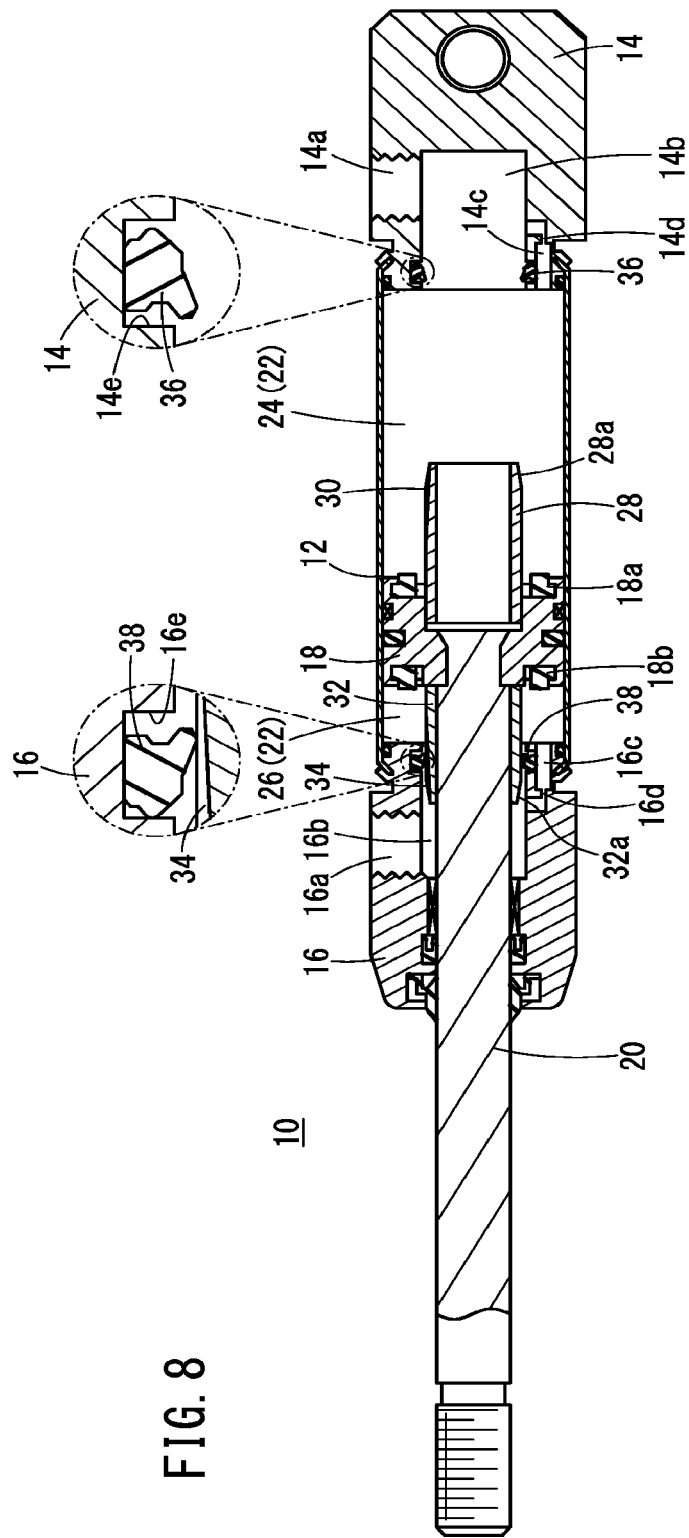
FIG. 8 is a cross-sectional view when the fluid pressure cylinder shown in FIG. 1 is in the vicinity of a stroke end on a rod side.

Then, the piston 18 reaches the stroke end on the head side, and a state in which the piston rod 20 is maximally retracted is brought about (see FIG. 7). Thereafter, when the position of the non-illustrated switching valve is switched, and the pressure fluid is supplied to the first pressure chamber 24 together with the pressure fluid being discharged from the second pressure chamber 26, the piston 18 is driven toward the rod cover 16.

When the piston 18 is driven toward the rod cover 16, the first cushion packing 36 moves inside the mounting groove 14e of the head cover 14 in a direction approaching the piston 18, due to contact friction with the first cushion ring 28 and the pressure of the fluid supplied from the first port 14a. Then, the axially directed projection 36b of the first cushion packing 36 is separated away from the other side surface of the mounting groove 14e, and the first pressure chamber 24 is placed in communication with the first cushion hole 14b via the gaps 36d between adjacent ones of the protrusions 36c of the first cushion packing 36.

From the time at which the piston 18 starts to move toward the rod cover 16 until the first cushion ring 28 is withdrawn from the first cushion hole 14b and the first cushion packing 36 is separated away from the outer circumference of the first cushion ring 28, the flow path area through which the pressure fluid is supplied to the first pressure chamber 24 is maintained at a constant value obtained by adding together the cross-sectional area of the first fixed orifice 14d and the area of the gaps 36d between adjacent ones of the protrusions 36c, and thereafter takes a value obtained by adding, to this constant value, the cross-sectional area of the head side cushioning grooves 30 which gradually increases. More specifically, when the piston 18 starts to move from the stroke end on the head side, a so-called meter-in control is performed in which the flow path area through which the pressure fluid is supplied to the first pressure chamber 24 is maintained at a constant value, and thereafter, gradually increases. Since the flow path area at the time of the meter-in control is greater, by the area of the gaps 36d, than the flow path area at the time of the aforementioned meter-out control, it is possible to suppress a runaway phenomenon of the piston 18, and thereby obtain a smooth movement start-up characteristic.

Thereafter, the fluid pressure cylinder 10 repeats the aforementioned operations. The fluid pressure cylinder 10 according to the present embodiment has been described as working in a state in which the piston rod 20 is maximally pushed out, however, the present invention is not limited to this feature. Further, in addition to it being possible for the cushioning effect at the stroke end on the rod side to be made different from the cushioning effect at the stroke end on the head side, it is also possible for the movement start-up characteristic of the piston 18 from the stroke end on the rod side to be made different from the movement start-up characteristic of the piston 18 from the stroke end on the head side.

In accordance with the fluid pressure cylinder 10 according to the present embodiment, by combining the cushioning grooves 30 and 34 that are formed in the cushion rings 28 and 32 and whose cross-sectional area changes, the fixed orifices 14d and 16d that are provided in the bypass passages 14c and 16c, and the cushion packings 36 and 38 that have the protrusions 36c and 38c and are capable of moving in the axial direction inside the mounting grooves 14e and 16e, the flow path area when the piston 18 approaches and stops at the stroke end, and the flow path area when the piston 18 starts to move from the stroke end can be finely set according to the displacement of the piston 18.

According to the present embodiment, although three head side cushioning grooves 30 are provided at intervals of 120 degrees around the axis 28b of the first cushion ring 28, a plurality of head side cushioning grooves 30 may be provided at appropriate intervals around the axis 28b of the first cushion ring 28, and further, only one head side cushioning groove 30 may be provided. The same considerations also apply to the rod side cushioning grooves 34.

Further, according to the present embodiment, the head side cushioning grooves 30 at sites with which the first cushion packing 36 is capable of coming into contact are made shallower toward the terminal end 30b, whereby the cross-sectional area thereof is gradually reduced. However, it is acceptable as long as the cross-sectional area thereof gradually decreases toward the terminal end 30b, and for example, the width thereof may be made narrower toward the terminal end 30b. The same considerations also apply to the rod side cushioning grooves 34.

Second Embodiment

Next, a description will be given with reference to FIGS. 11 to 15 concerning a fluid pressure cylinder 50 according to a second embodiment. The second embodiment differs from the first embodiment in the structure of the cushion packing, and in that the bypass passage and the fixed orifice are not provided. Constituent elements, which are the same or equivalent to those of the fluid pressure cylinder 10 described above, are denoted by the same reference characters, and detailed description of such features is omitted.

The mounting groove 14e for mounting a first cushion packing 52 is formed on an inner wall of the head cover 14 constituting the first cushion hole 14b. The annular shaped first cushion packing 52 is capable of slidably contacting the first cushion ring 28, and is mounted so as to be capable of moving in the axial direction inside the mounting groove 14e.

Figure 14:
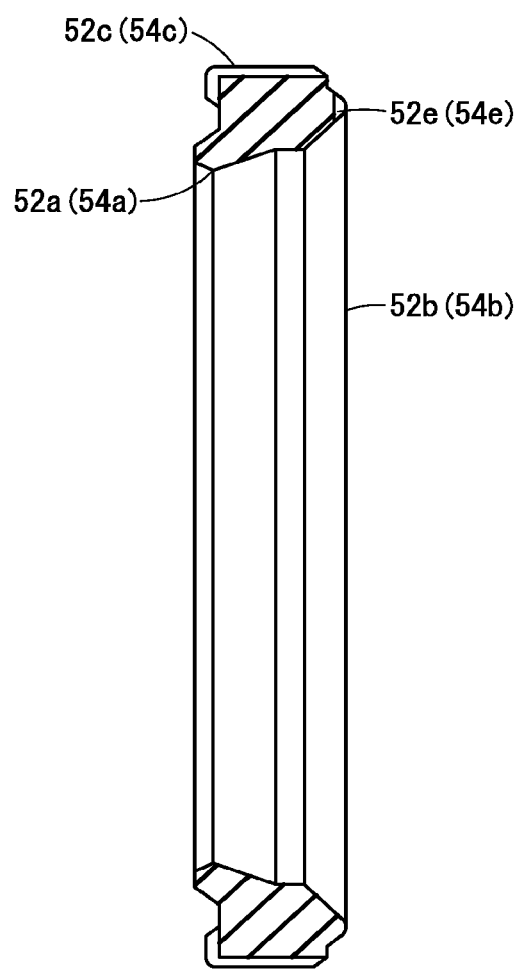
FIG. 14 is a cross-sectional view taken along line XIV-XIV of the cushion packing shown in FIG. 13.

As shown in FIG. 14, the first cushion packing 52 includes an annular shaped inner diametrical side projection 52a that projects out toward an inner side in a radial direction from the inner circumferential surface thereof, and an annular shaped axially directed projection 52b that projects out in an axial direction from a side surface separated away from the piston 18. The first cushion packing 52 is in sliding contact with the outer circumference of the first cushion ring 28 at the inner diametrical side projection 52a.

Figure 11:
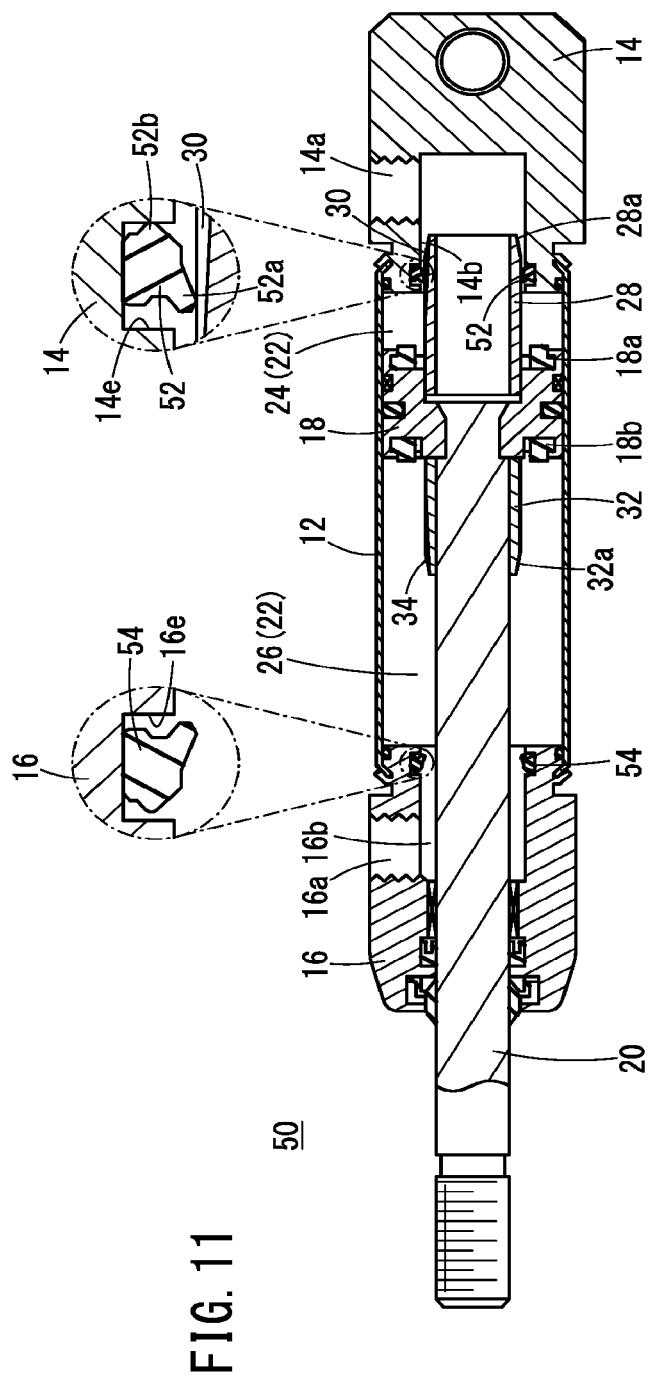
FIG. 11 is a cross-sectional view when a fluid pressure cylinder according to a second embodiment of the present invention is in the vicinity of a stroke end on the head side.
Figure 13:
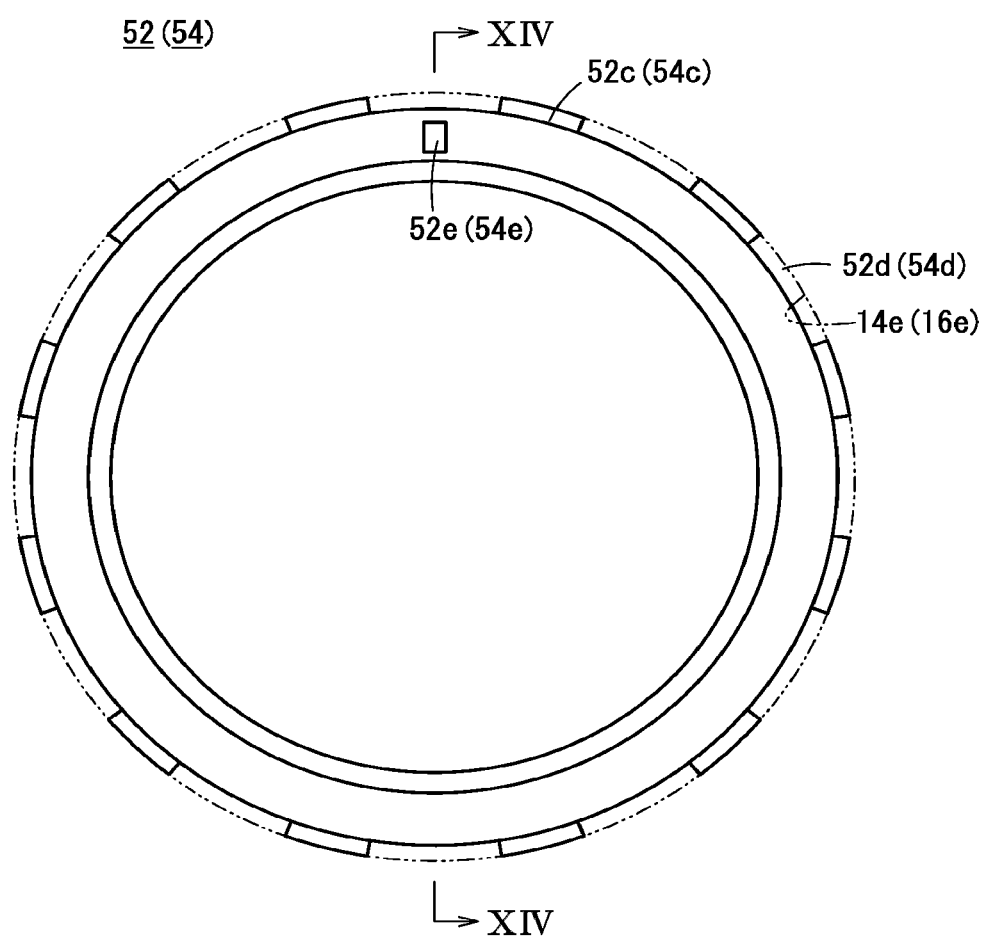
FIG. 13 is a view of a cushion packing of the fluid pressure cylinder shown in FIG. 11 as viewed from an axial direction thereof.

When the first cushion packing 52 is moved inside the mounting groove 14e in a direction away from the piston 18, a distal end of the axially directed projection 52b of the first cushion packing 52 comes into contact with another side surface (a side surface separated away from the piston 18) of the mounting groove 14e (see FIG. 11). As shown in FIGS. 13 and 14, due to the distal end thereof being cut out at a predetermined position in the circumferential direction, the axially directed projection 52b includes a cutout portion 52e. Although according to the present embodiment, the cutout portion 52e is provided at only one location in the circumferential direction of the axially directed projection 52b, the cutout portion 52e may be provided at a plurality of locations in the circumferential direction.

The first cushion packing 52 includes a plurality of protrusions 52c provided at equal intervals in the circumferential direction and extending from the outer circumferential surface of the first cushion packing 52 to a side surface near the piston 18. Distal ends of the plurality of protrusions 52c positioned on the outer circumference are in contact with the bottom surface of the mounting groove 14e at all times, and when the first cushion packing 52 is moved inside the mounting groove 14e in a direction approaching the piston 18, the distal ends of the plurality of protrusions 52c positioned on the side surface come into contact with one side surface (a side surface near the piston 18) of the mounting groove 14e.

Gaps 52d are formed between adjacent ones of the protrusions 52c. When the first cushion packing 52 is placed in sliding contact with the first cushion ring 28, the gaps 52d maintain a state of communication between the first pressure chamber 24 and the first cushion hole 14b, and serve as passages for the pressure fluid. Further, when the distal end of the axially directed projection 52b comes into contact with the other side surface of the mounting groove 14e, the cutout portion 52e of the axially directed projection 52b maintains the state of communication between the first pressure chamber 24 and the first cushion hole 14b, and serves as a passage for the pressure fluid. The flow path area of the passage formed by the cutout portion 52e is smaller than the flow path area of the passages formed by the gaps 52d.

A second cushion packing 54, which has the same configuration as that of the first cushion packing 52, is mounted in the mounting groove 16e of the rod cover 16 in a state in which the orientation thereof differs from that of the first cushion packing 52.

Figure 12:
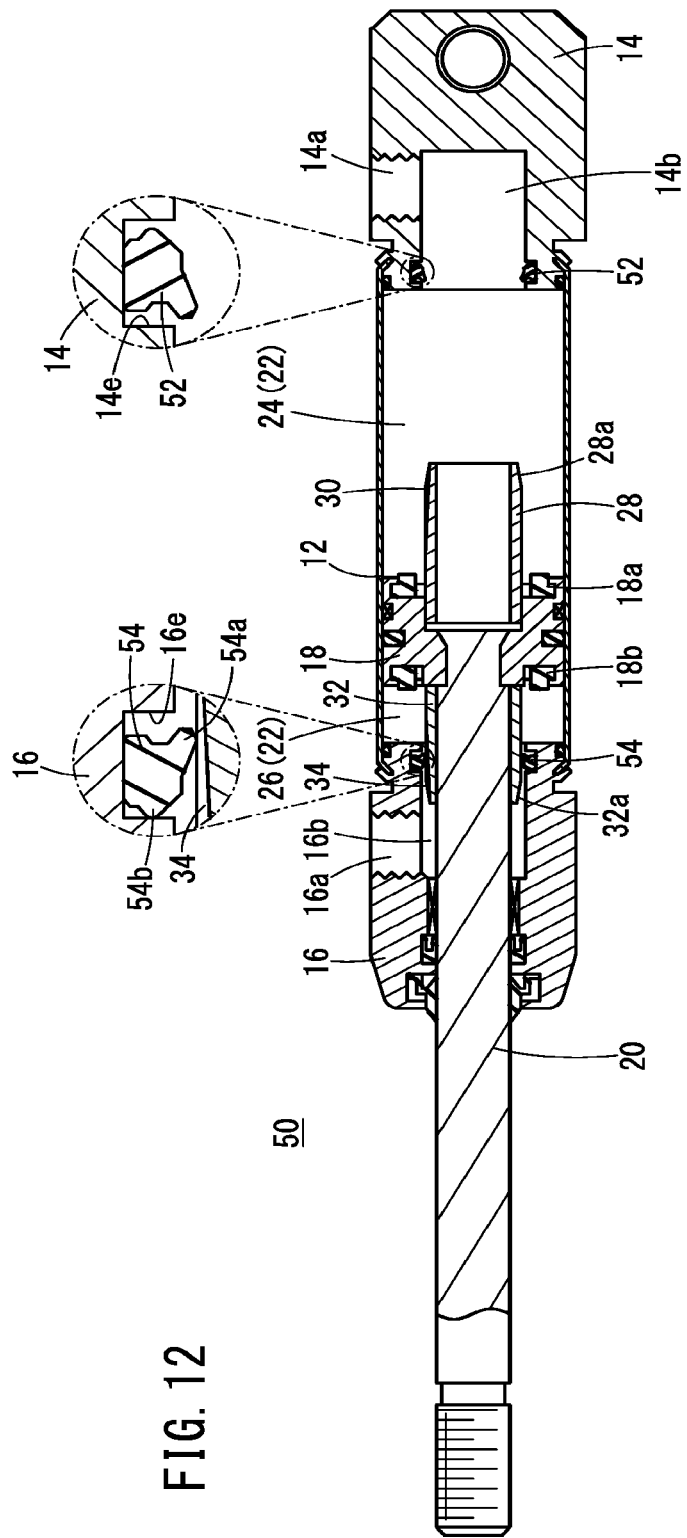
FIG. 12 is a cross-sectional view when the fluid pressure cylinder shown in FIG. 11 is in the vicinity of a stroke end on the rod side.

When the piston 18 is driven toward the rod cover 16 by the pressure fluid being supplied to the first pressure chamber 24 together with the fluid being discharged from the second pressure chamber 26, the second cushion ring 32 is inserted into the second cushion hole 16b of the rod cover 16, and the second cushion packing 54 that is mounted on the rod cover 16 is placed in sliding contact with the outer circumferential surface of the second cushion ring 32 on an inner diametrical side projection 54a thereof (see FIG. 12). At this time, the second cushion packing 54 is moved inside the mounting groove 16e of the rod cover 16 in a direction away from the piston 18, and an axially directed projection 54b thereof comes into contact with another side surface of the mounting groove 16e.

From the time at which the second cushion packing 54 begins to be placed in sliding contact with the second cushion ring 32 until the second cushion packing 54 reaches the terminal end of the rod side cushioning grooves 34 prior to the piston 18 reaching the stroke end on the rod side, the flow path area through which the second pressure chamber 26 and the second port 16a communicate takes a value obtained by adding the flow path area of a passage formed by a cutout portion 54e of the second cushion packing 54 to the cross-sectional area of the rod side cushioning grooves 34 at the location where the second cushion packing 54 is placed in contact. From the time at which the second cushion packing 54 reaches the terminal end of the rod side cushioning grooves 34 until the piston 18 reaches the stroke end on the rod side, the flow path area becomes equal to the flow path area of the passage formed by the cutout portion 54e of the second cushion packing 54. More specifically, when the piston 18 approaches and stops at the stroke end on the rod side, a so-called meter-out control is performed in which the flow path area through which the pressure fluid is discharged from the second pressure chamber 26 gradually decreases, and thereafter becomes constant, whereby a desired cushioning effect is obtained.

After the piston 18 has reached the stroke end on the rod side, when the pressure fluid is supplied to the second pressure chamber 26 together with the pressure fluid being discharged from the first pressure chamber 24, the piston 18 is driven toward the head cover 14. The second cushion packing 54 moves inside the mounting groove 16e of the rod cover 16 in a direction approaching the piston 18, the axially directed projection 54b thereof separates away from the other side surface of the mounting groove 16e, and the second pressure chamber 26 is placed in communication with the second cushion hole 16b via gaps 54d provided between adjacent ones of the protrusions 54c of the second cushion packing 54.

From the time at which the piston 18 starts to move toward the head cover 14 until the second cushion ring 32 is withdrawn from the second cushion hole 16b and the second cushion packing 54 is separated away from the outer circumference of the second cushion ring 32, the flow path area through which the pressure fluid is supplied to the second pressure chamber 26 is maintained at the flow path area of the passages formed by the gaps 54d between adjacent ones of the protrusions 54c, and thereafter takes a value obtained by adding, to this flow path area, the cross-sectional area of the rod side cushioning grooves 34 which gradually increases. More specifically, when the piston 18 starts to move from the stroke end on the rod side, a so-called meter-in control is performed in which the flow path area through which the pressure fluid is supplied to the second pressure chamber 26 is maintained at a constant value, and thereafter, gradually increases. Since the flow path area of the passages formed by the gaps 52d is greater than the flow path area of the passage formed by the cutout portion 52e, the flow path area at the time of the meter-in control is greater than the flow path area at the time of the aforementioned meter-out control, and it is possible to suppress a runaway phenomenon of the piston 18, and thereby obtain a smooth movement start-up characteristic.

Figure 15:
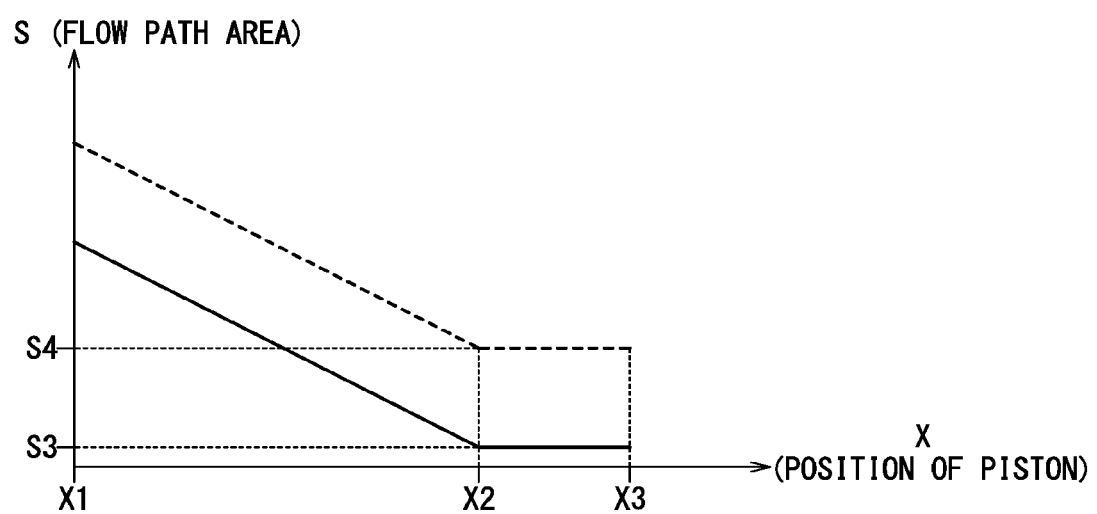
FIG. 15 is a graph showing a relationship between a position of a piston and a flow path area in the vicinity of a stroke end, for the fluid pressure cylinder shown in FIG. 11.

In FIG. 15, there are shown a relationship between the position X of the piston 18 when the piston 18 approaches and stops at the stroke end on the rod side, and the flow path area S through which the pressure fluid is discharged from the second pressure chamber 26, as well as a relationship between the position X of the piston 18 when the piston 18 starts to move from the stroke end on the rod side, and the flow path area S through which the pressure fluid is supplied to the second pressure chamber 26. The former relationship is shown by the solid line, and the latter relationship is shown by the dotted line.

In FIG. 15, X1 indicates a position of the piston 18 when the second cushion packing 54 starts to be placed in sliding contact with the second cushion ring 32 or when such sliding contact is completed. X2 indicates a position of the piston 18 when the second cushion packing 54 is positioned at the terminal end of the rod side cushioning grooves 34. X3 indicates a position of the piston 18 at the stroke end on the rod side. Further, S3 is the flow path area of the passage formed by the cutout portion 54e of the axially directed projection 54b of the second cushion packing 54, and S4 is the flow path area of the passages formed by the gaps 54d between adjacent ones of the protrusions 54c of the second cushion packing 54. The relationship between the position X of the piston 18 and the flow path area S in the vicinity of the stroke end on the head side of the piston 18 is the same as the foregoing.

In accordance with the fluid pressure cylinder 50 according to the present invention, by combining the cushioning grooves 30 and 34 that are formed in the cushion rings 28 and 32 and whose cross-sectional area changes, and the cushion packings 52 and 54 that have the protrusions 52c and 54c and the cutout portions 52e and 54e and are capable of moving in the axial direction inside the mounting grooves 14e and 16e, the flow path area when the piston 18 approaches and stops at the stroke end, and the flow path area when the piston 18 starts to move from the stroke end can be finely set according to the displacement of the piston 18.

The present invention is not limited to the embodiments described above, and various configurations can be adopted therein without departing from the essence and gist of the present invention.

What is claimed is:

1. A fluid pressure cylinder comprising:
    a cylinder tube and a cover member fixed to an end of the cylinder tube, the fluid pressure cylinder including a pressure chamber formed between a piston and the cover member;
    a port configured to supply and discharge a pressure fluid to and from the pressure chamber, and a cushion hole configured to connect the pressure chamber and the port, the port and cushion hole being provided in the cover member;
    a tubular cushion ring attached to the piston or a piston rod so as to be insertable into and withdrawable from the cushion hole as the piston moves;
    a cushion packing having an annular shape and configured to slidably contact an outer circumference of the cushion ring, mounted in a mounting groove formed on an inner wall of the cover member constituting the cushion hole, the cushion packing being configured to be movable in an axial direction;
    the cushion packing including a plurality of protrusions extending from an outer circumferential surface of the cushion packing to a side surface thereof near the piston, and disposed alongside one another in a circumferential direction;
    a cushioning groove extending in a direction parallel to an axis of the cushion ring and having a cross-sectional area that changes, formed on an outer circumferential surface of the cushion ring; and
    a gap formed between adjacent ones of the plurality of protrusions of the cushion packing,
    wherein:
    the cushion packing includes an axially directed projection having an annular shape and is configured to project out in an axial direction from a side surface thereof facing away from the piston, and
    the axially directed projection includes a cutout portion formed by cutting out a distal end part thereof at a predetermined position in the circumferential direction.

2. The fluid pressure cylinder according to claim 1, wherein a flow path area of a passage formed by the cutout portion is smaller than a flow path area of a passage formed by the gap between adjacent ones of the plurality of protrusions of the cushion packing.

3. The fluid pressure cylinder according to claim 1, wherein a plurality of the cushioning groove are provided and are formed at equal angular intervals around the axis of the cushion ring.

4. The fluid pressure cylinder according to claim 1, wherein the cushioning groove starts at an end of the cushion ring on a side of the cover member, and ends at a position on the cushion ring that is more separated away from the piston than a location in contact with the cushion packing at a stroke end where the piston comes into contact with the cover member.

5. The fluid pressure cylinder according to claim 4, wherein a lateral cross section of the cushioning groove at a site with which the cushion packing is allowed to come into contact has a shape in which an area thereof gradually decreases toward a terminal end of the cushion groove.

6. The fluid pressure cylinder according to claim 5, wherein the lateral cross section of the cushioning groove at the site with which the cushion packing is allowed to conic into contact has a shape that gradually becomes shallower toward the terminal end of the cushion groove.

7. The fluid pressure cylinder according to claim 1, wherein the cover member comprises one of a head cover fixed to one end of the cylinder tube, and a rod cover fixed to another end of the cylinder tube.

* * * * *